(Model.)

W. H. MERCER.
MACHINE FOR MIXING AND GRINDING FERTILIZERS.

No. 286,463. Patented Oct. 9, 1883.

Witnesses.
Louis R. Gardner
J. W. Garner

Inventor.
W. H. Mercer,
per
J. A. Lehmann,
Atty.

UNITED STATES PATENT OFFICE.

WILLIAM H. MERCER, OF MERCER, SOUTH CAROLINA.

MACHINE FOR MIXING AND GRINDING FERTILIZERS.

SPECIFICATION forming part of Letters Patent No. 286,463, dated October 9, 1883.

Application filed July 25, 1883. (Model.)

*To all whom it may concern:*

Be it known that I, WILLIAM H. MERCER, of Mercer, in the county of Union and State of South Carolina, have invented certain new and useful Improvements in Machines for Grinding and Mixing Manures and Fertilizers; and I do hereby declare the following to be a full, clear, and exact description of the invention, such as will enable others skilled in the art to which it pertains to make and use it, reference being had to the accompanying drawings, which form part of this specification.

My invention relates to an improvement in machines for grinding and mixing manures and fertilizers; and it consists in the combination of a suitable wheel having either formed directly upon its side or having secured to its side a smaller wheel, which is provided with suitable cutters, with a hopper having knives or cutters secured at its bottom, so as to intersect the cutters upon the wheel, and which is provided with a shaking screen, which is placed upon the top of the hopper, and which is provided with suitable arms or projections, which extend down into the hopper, so as to stir the manure or fertilizer placed therein, as will be more fully described hereinafter.

The object of my invention is to provide a machine in which manures of all kinds can be ground up, so as to be readily distributed over the field, or to mix manures or fertilizers of different kinds together, as may be desired.

Figure 1:
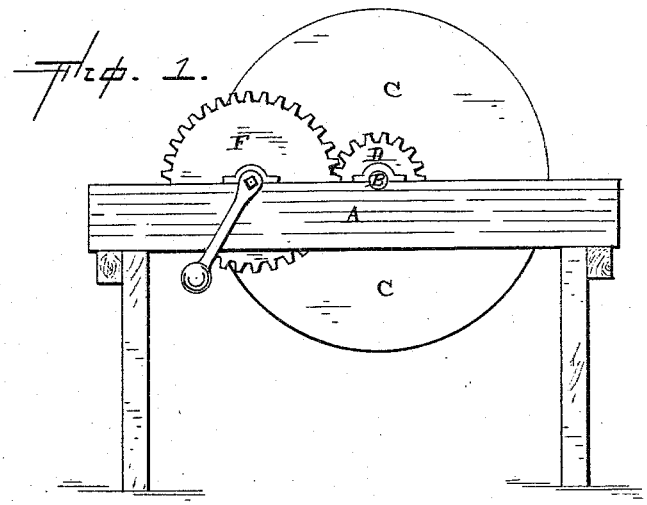
Figure 2:
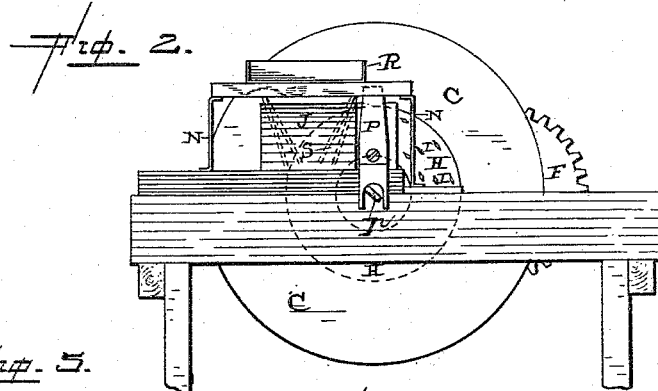
Figure 5:
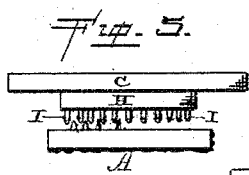
Figure 3:
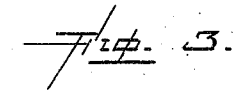
Figure 3:
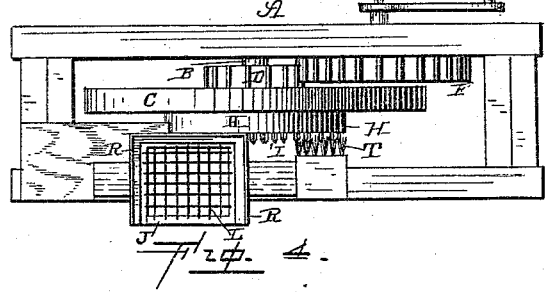
Figure 4:
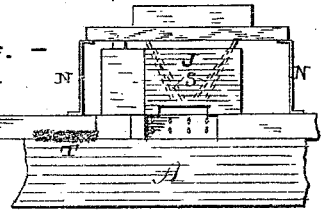

Figures 1 and 2 are side elevations of a machine embodying my invention, taken from opposite sides. Fig. 3 is a plan view. Fig. 4 is a detail view of the hopper, taken from the inner side. Fig. 5 is a detail view, showing the cutters on both the frame and wheel.

A represents a suitable frame of any desired construction, in which the shaft B is journaled. Upon this shaft is secured the large wheel C, which may be of cast-iron or any other material that may be preferred. In order to revolve this wheel at the necessary speed, a pinion, D, is secured to the shaft, and meshing with this pinion is the large driving-wheel F, which may be operated either by a crank or a pulley, as may be preferred. Either cast on the wheel as a part thereof or secured to the inner side of the wheel is a smaller wheel, H, from the side of which project a series of cutters, I, which are arranged in concentric circles, as shown. When the shaft and the large wheel are made to revolve, this small wheel, which may either be cast in a single piece with the large wheel or formed separately, and then bolted thereto, as above stated, is made to revolve at the same time, so as to give the proper motion to the cutters.

Secured upon the side of the frame is the hopper J, in which the manure or fertilizer is placed to be ground or mixed. In order to prevent lumps above a certain size from being thrown into the hopper, there is placed upon its top a screen, L, which is supported upon flexible uprights N. In order to give this screen a reciprocating motion, there is pivoted to either the frame A or the end of the hopper a vibrating lever, P, which has its upper end attached to the screen, and its lower end slotted, so as to be operated by a cam or other device, $p$, which is formed upon the end of the shaft itself. When the shaft is made to revolve, the cam-shaped end reciprocates the lever back and forth, and thus causes the screen to shake sufficiently to separate the manure or fertilizer which has been thrown upon its top. Around three sides of the top of this screen is formed a flange or wall, R, while upon the outer side there is nothing to prevent the large lumps, or the straw, sticks, and other things which may be mixed with the manure or fertilizer, from dropping off. The movement of the screen separates all the finer portions of the manure or fertilizer from the coarser part, and causes the finer portions to drop into the hopper below.

In order to prevent the manure or fertilizer from clogging in the hopper, there are secured to opposite sides of the screen suitable rods, S, which project down into the hopper, and which keep the fertilizer from clogging. Upon the lower edge of the hopper, just below that point where the manure or fertilizer drops from it, are secured a large number of cutters, which are so placed as to intersect the cutters upon the wheel. As the manure or fertilizer drops in the hopper, it is caught between the cutters and ground or cut into very small pieces and thoroughly mixed together. In order to prevent the cutters upon the wheel from becoming clogged, a suitable cleaningbrush or other device, T, as shown in Fig. 3, is employed, which, catching in between the cutters, keeps them always clear.

A machine constructed as above described will enable farmers and others to cut and grind the farm manures in such a manner as to enable them to be distributed readily and evenly over the ground, or to mix with these manures other fertilizers, or to mix a number of different fertilizers together, as may be desired.

Having thus described my invention, I claim—

1. In a manure mixing and grinding machine, the combination of a large wheel provided with cutters, a hopper, a shaking screen, and suitable stirring devices, which are secured below the point of discharge from the hopper, substantially as shown.

2. The combination of the operating mechanism, the large wheel provided with cutters, the hopper, the shaking screen provided with stirring devices, and the cutters secured below the point of discharge from the hopper, substantially as set forth.

In testimony whereof I affix my signature in presence of two witnesses.

WM. H. MERCER.

Witnesses:
F. A. LEHMANN,
A. S. PATTISON.